UNITED STATES PATENT OFFICE.

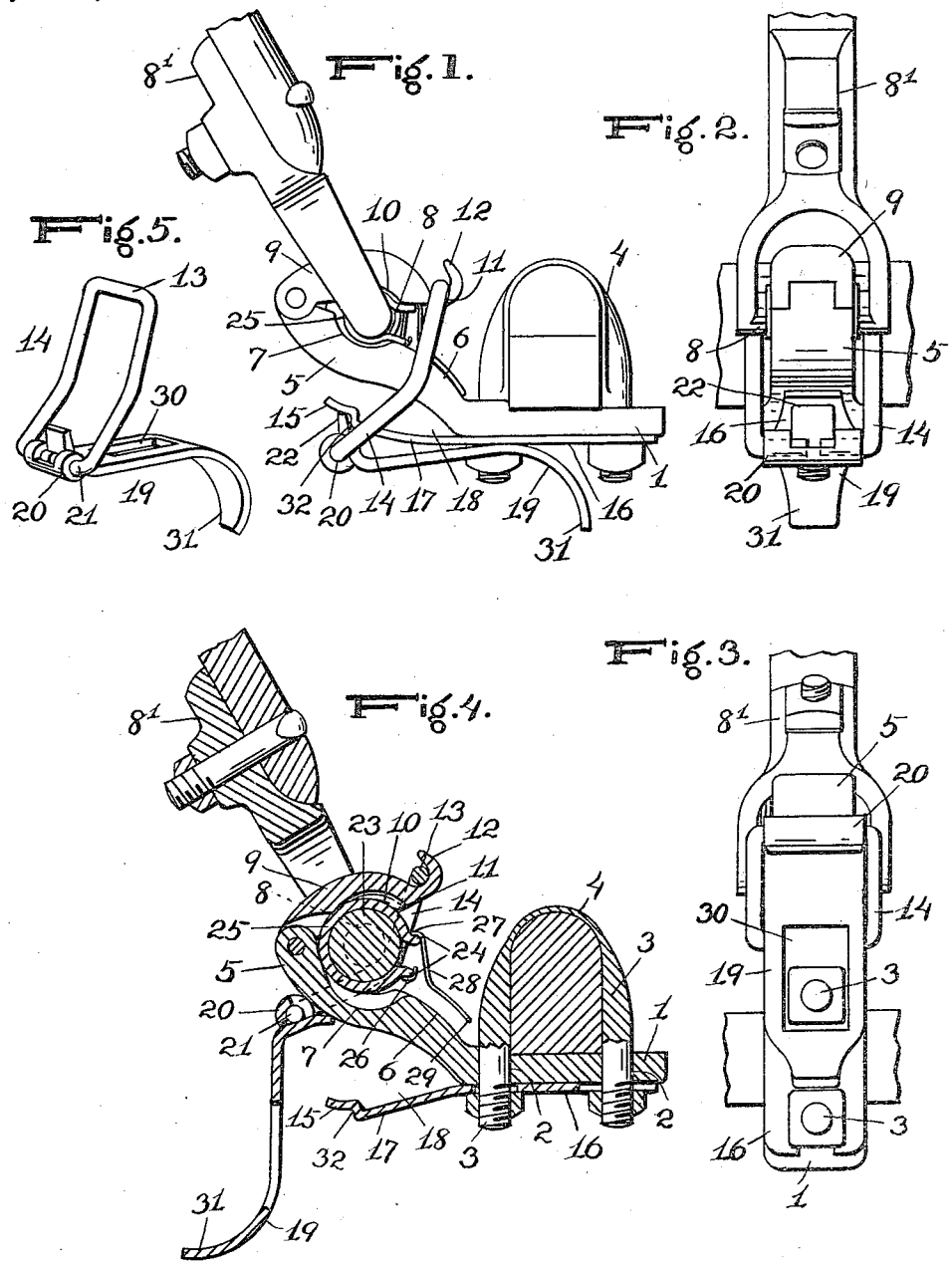

McKENDREE F. BISHOP, OF ELGIN, ILLINOIS.

THILL-COUPLING.

1,267,501.

Specification of Letters Patent.   Patented May 28, 1918.

Application filed March 19, 1914.   Serial No. 825,859.

*To all whom it may concern:*

Be it known that I, McKENDREE F. BISHOP, a citizen of the United States, resident of Elgin, in the county of Kane, and State of Illinois, have made a certain new and useful Invention in Thill-Couplings; and I declare the following to be a full, clear, and exact description of the same, such as will enable others skilled in the art to which it appertains to make and use the invention, reference being had to the accompanying drawings, and to letters or figures of reference marked thereon, which form a part of this specification.

Figure 1 is a side view of the invention as applied.

Fig. 2 is a front view of the same.

Fig. 3 is a bottom plan view of the same.

Fig. 4 is a central vertical section of the same, with the lever released and the cap raised.

Fig. 5 is a detail perspective view of the lever and the link.

The invention has relation to thill couplings, and it consists in the novel construction and combinations of parts, as hereinafter set forth.

In the accompanying drawings, illustrating the invention, the numeral 1, designates the draft bar, having perforations 2, engaged by the stems 3, of the axle clip 4. The draft bar is provided with a forwardly extending upwardly bent portion 5, having an inner upwardly extending shoulder 6, facing the axle or clip, and forwardly of said shoulder with a recess bearing or seat 7, for the transverse bar 8, of the thill iron 8′, a pivoted cap 9, of the draft bar, having also a depression or seat 10, to engage the upper part of the bar 8, of the thill iron. This pivoted cap has, at its rear end, a shoulder 11, facing toward the axle or clip, and approximately parallel to the shoulder 6; and an upwardly and forwardly bent terminal portion or hook 12, approximately parallel to the shoulder 11, and forming in connection therewith a seat for the upper transverse bar 13, of a depending link 14.

A retaining spring 15, has a horizontal body 16, lying flat against the longitudinal lower surface of the draft bar, said spring being extended forwardly at 17, below the upturned forward part of the draft bar and separated therefrom by an interval 18.

A lever 19 has near its forward end a fulcrum connection at 20 with the lower transverse bar 21 of said link; a short work arm extending upwardly and detachably engaging at 22 the free end of said spring slightly in rear of said fulcrum connection; and a long rearwardly extending power arm approximately horizontal and lying close to the rear horizontal body of the draft bar and to the body of the spring.

When the lever is brought or pulled forwardly against the tension of the spring, it will, at the latter part of the forward movement, start or snap to full open or released position, as shown in Fig. 4, of the drawings, wherein the lever is shown hanging down from the link and disengaged from the spring.

A breakage of the spring will cause the lever to assume the same open or released position. In this position of the lever, draft upon the thill iron will tend to pull said iron from its seat in the draft bar, which would cause disengagement of the parts, and of the thills from the vehicle. In the present case, however, the forwardly and upwardly turned terminal hook end of the pivoted cap will, in the raised position of the cap caused by draft upon the thill iron, or in fact in any position assumed by the pivoted cap, effectually prevent any rearward movement of the link required to cause disengagement of the link from the cap, the forward movement of the link being prevented by abutment or contact of the lateral link bars with the transverse bar of the thill iron, owing to the breadth or transverse measure of the link being less than the length of said transverse bar.

The link can thus not escape from its seat by movement either rearwardly or forwardly, but will move upwardly with the pivoted cap until the lower transverse bar 21, has contact with the lower surface of the part 5, of the draft bar, when any further raising of the pivoted cap will be prevented.

It is preferred that the transverse bar of the thill iron shall have a central approximately spherical portion 23, fitting in correspondingly shaped seats of the pivoted cap and of the part 5, of the draft iron, a hollow approximately spherical washer surrounding the part 23.

And in order to prevent any turning movement of the washer in either direction upon said transverse bar of the thill iron, the free ends 24, of the washer 25, are connected by wire loops 26, having each an upper shoulder 27, bearing against the free end of the pivoted cap, said loops being extended downward at 28, to bear against the shoulder 6 of the draft bar. The extensions 28, of the wire loops, are joined transversely at 29, the whole being formed of a single piece of wire, and serving, by the double bearing stated, to prevent any turning movement of the washer which would cause it to exercise its function imperfectly.

The lever is usually stamped from a single piece of metal, having a downturned sleeve or fulcrum end pivotally engaging the lower bar of the link, and an upper lug stamped from the material of the lever for engagement with the free end of the spring, the lever having also a cut out portion 30 in the body thereof to receive the nuts upon the bolt stems of the axle clip and enable the lever to be turned closely against the lower surface of the draft bar. The lever is further provided with a downturned free handle end 31.

The retaining spring has usually a lower shoulder 32, just in rear of its free end, against which the lug of the lever has stop engagement to fix the relative positions of the lever and the spring.

This spring is substantially straight, and works within the space below the upwardly extending forward portion of the draft bar, said spring and the body of the lever 19 being normally slightly inclined to the horizontal in opposite directions, or upwardly and downwardly, and being substantially upon a level with the lower surface of the rear body of said bar.

Preferably, the link is made with a bend therein, forming a recess facing the transverse bar of the thill iron, said recess engaging said transverse bar when the parts are disengaged, as in Fig. 4. This engagement of the transverse bar and recess of the link is of use in further preventing release of the draft iron.

What I claim is:

1. In a thill coupling, a draft bar having a horizontal rear body and a forward portion provided with an open top recess, an axle clip engaging said body, a cap pivoted to the forward end of the draft bar and overlying said recess, a depending link having an upper transverse bar engaging the free end of said cap and a lower transverse bar, a thill iron having a transverse bar engaging said recess, a retaining spring having a horizontal body below said body of the draft bar and a resilient end portion projecting directly from the forward portion of its body below the forward portion of the draft bar, and a lever having near its forward end a fulcrum connection with the lower bar of said link, an upwardly extending work arm detachably engaging the free end of said spring and a rearwardly extending power arm.

2. In a thill coupling, a draft bar having an open-top recess bearing, an axle clip engaging the draft bar, a pivoted cap for said bearing, a depending link having an upper transverse bar engaging said cap and a lower bar, a thill iron having a transverse bar engaging said bearing, a substantially straight retaining spring having a lower shoulder in rear of its free end, said spring being located below the draft bar and engaged by said axle clip, and a lever having fulcrum connection with the lower bar of said link and a bent work-arm detachably engaging the free end of said spring and adapted for stop engagement with said shoulder.

3. In a thill coupling, a draft bar having an upwardly extending shoulder and a pivoted cap, a depending link having an upper transverse bar engaging said cap and a lower bar, a thill iron having a transverse bar provided with an approximately spherical enlargement, said draft bar and said cap having correspondingly shaped recesses surrounding said enlargement, a retaining spring, a lever having fulcrum connection with the lower end of said link and engagement with said spring, a hollow approximately spherical washer surrounding said enlargement and interposed between the same and said recesses, and a wire device having loops connecting the free ends of said washer and bearing at their upper ends against the free end of said cap, and a downward extension bearing against said shoulder of the draft bar, whereby the washer is secured in position against displacement.

In testimony whereof I affix my signature in presence of two witnesses.

McKENDREE F. BISHOP.

Witnesses:
JOHN W. McQUEEN,
WILLIAM F. McCORMACK.